Figure 7:
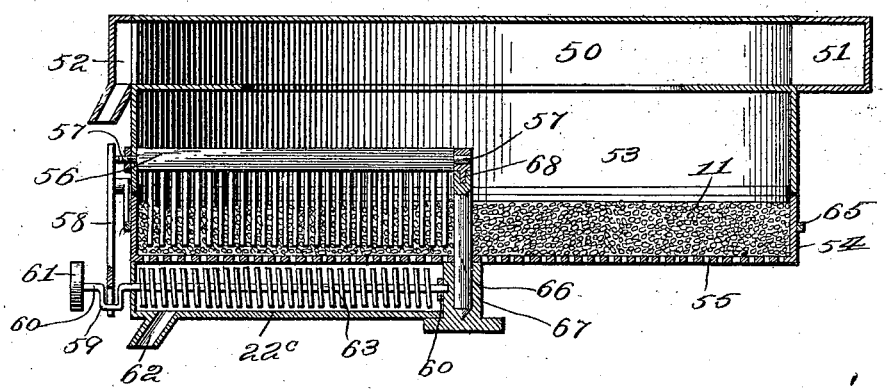

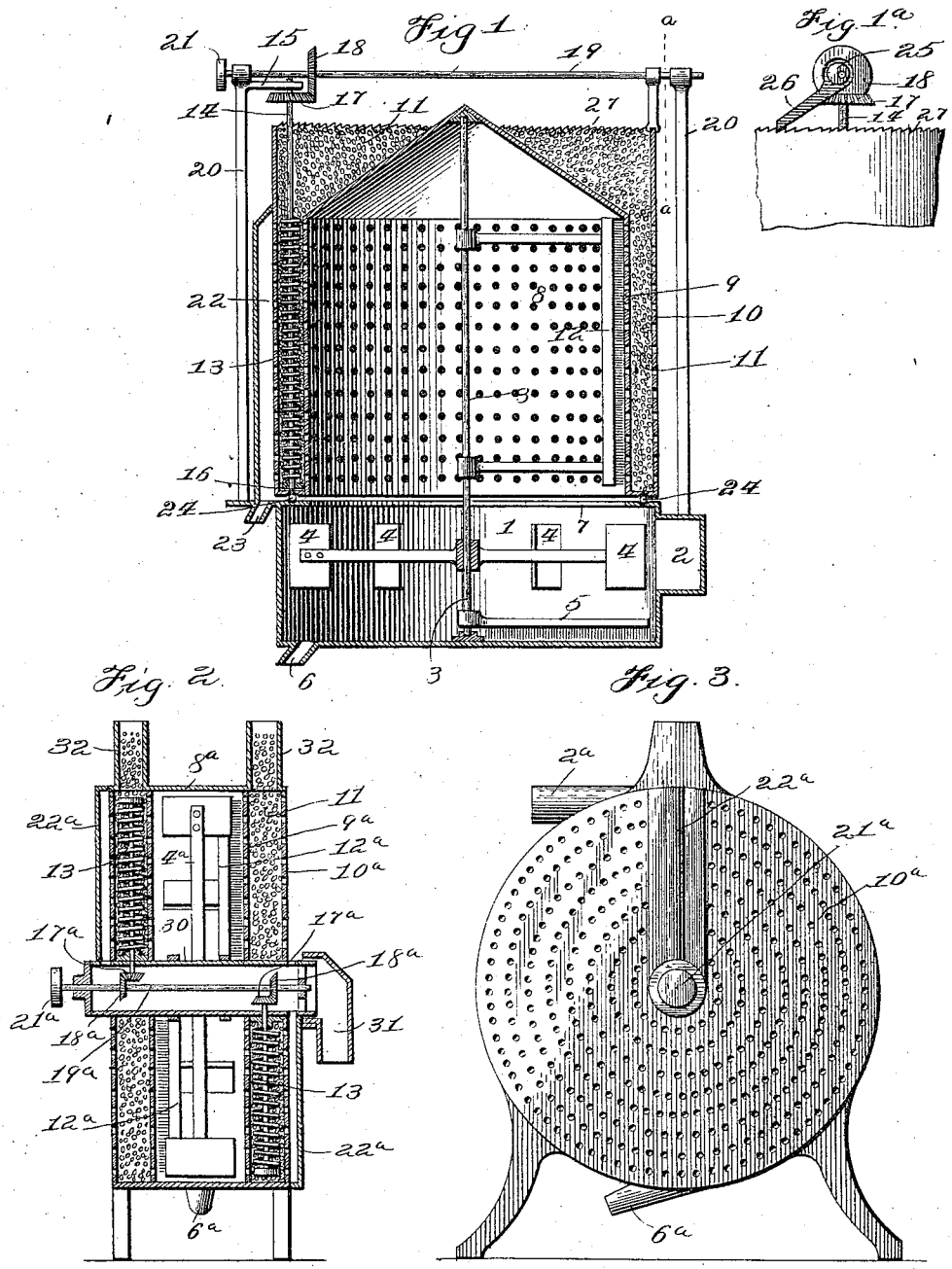

(No Model.) 3 Sheets—Sheet 2.
J. M. CASE.
DUST ARRESTER AND COLLECTOR.
No. 575,824. Patented Jan. 26, 1897.
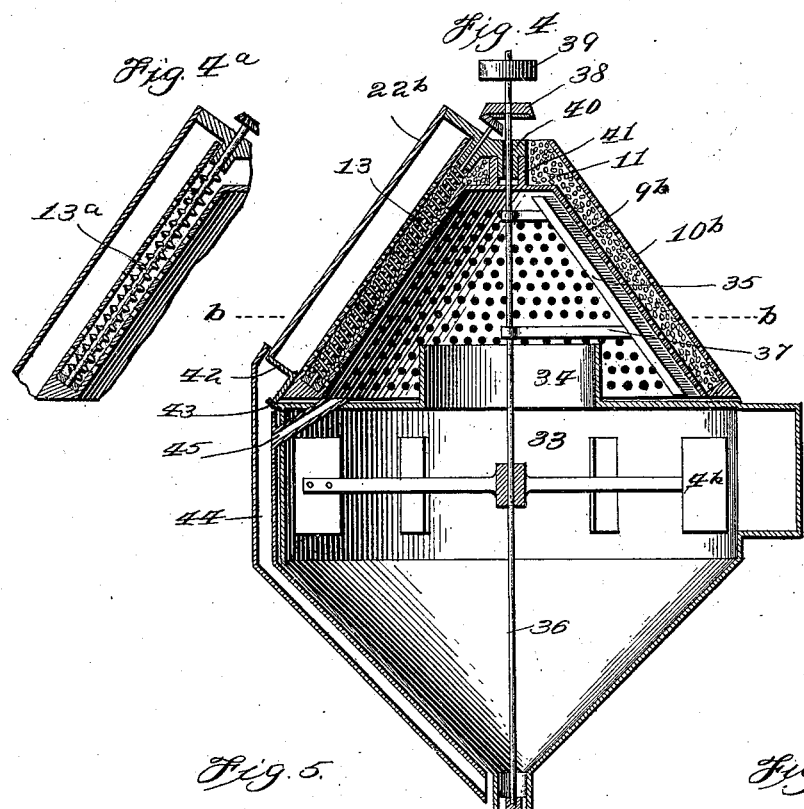
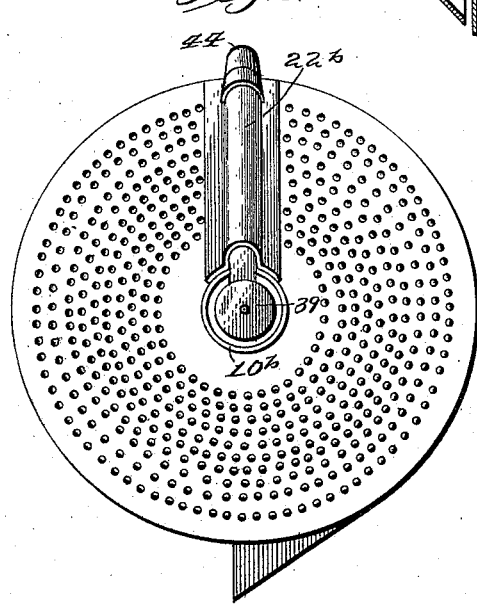
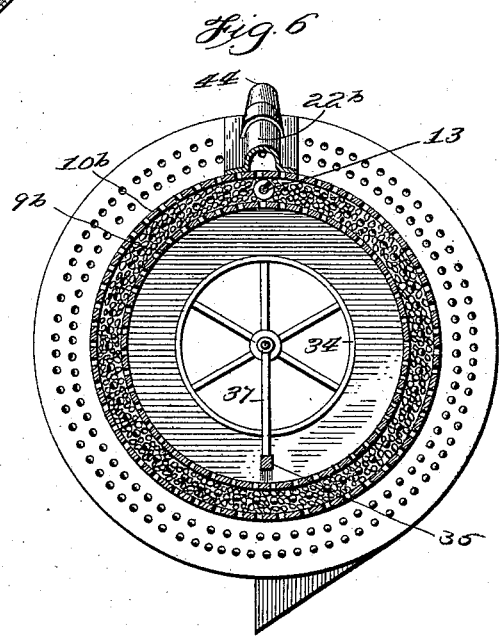
Witnesses:
Herbert Bradley
Jas. W. White
Inventor:
John M. Case.
By Knight Bros
Attorneys.

(No Model.) 3 Sheets—Sheet 3.
J. M. CASE.
DUST ARRESTER AND COLLECTOR.

No. 575,824. Patented Jan. 26, 1897.

Witnesses:
Herbert Bradley
W. E. Allen

Inventor
John M. Case.
By Knight Bros
Attorneys

United States Patent Office.

JOHN M. CASE, OF CINCINNATI, OHIO.

DUST ARRESTER AND COLLECTOR.

SPECIFICATION forming part of Letters Patent No. 575,824, dated January 26, 1897.

Application filed July 3, 1896. Serial No. 598,016. (No model.)

*To all whom it may concern:*

Be it known that I, JOHN M. CASE, a citizen of the United States, and a resident of Cincinnati, in the county of Hamilton and State of Ohio, have invented certain new and useful Improvements in Dust Arresters and Collectors, of which the following is a specification.

My present invention is an improvement in that class of machines for which I have obtained Letters Patent No. 563,709, dated July 7, 1896, wherein the dust is collected by causing the dust-ladened air to pass through a wall of filtering material of small component parts, which is repeatedly treated to remove the dust therefrom and returned for reuse.

My present invention consists primarily in locating an agitator in the filtering-wall, so as to agitate the component parts of the filtering material and release the arrested dust without removing the material, as heretofore. In order to avoid interrupting the continuity of the process, the greater part of the filtering-wall is left at all times intact, the agitator being confined in its operation at any given time to a very small portion of the filtering-body, and in order that all parts of the filtering-body may be relieved of the arrested dust as often as necessary a relative movement is produced between the agitator and the body of filtering material either by moving the agitator while the body of material remains stationary or by retaining the agitator in a fixed position and moving the body of filtering material. The relative movement is comparatively slow and the agitator is preferably such that it makes its way through the body of material as the relative movement takes place by causing the material in its immediate vicinity to feed past it. This has the effect of breaking up the pockets in which the dust has been arrested and permitting the air to blow out the arrested dust. It remains necessary only to provide for catching the dust which is thus constantly being blown out along the restricted line of the agitator when the operation of collecting the dust is complete. This is easily arranged by the employment of a shield which covers a sufficient portion of the filtering-wall directly over and adjacent to the agitator to catch all dust which is released and blown through. Inasmuch as all of the filtering material is continuously subjected to treatment by the agitator, but a restricted line of material being treated at any one time, while all the rest of it remains intact for arresting the dust, it will be seen that the dust arresting and collecting process is complete and continuous.

My present invention is capable of wide application. It is well adapted for use in connection with the "cyclone" type of machine, and when thus applied it will permit the settlement by gravity of all the heavier particles and then thoroughly remove from the air all the finer particles which generally escape in that type of machine. In applying the invention to this type of machine I may either locate the filtering medium, together with its agitator, directly in the walls of the vortex-chamber, or I may employ separate filtering-walls which will fit over the escape-opening of the ordinary cyclone-machine and treat the air escaping therefrom to remove the dust which ordinarily returns to the atmosphere of the mill or is wasted.

My invention will be fully understood upon reference to the accompanying drawings, in which—

Figure 8:
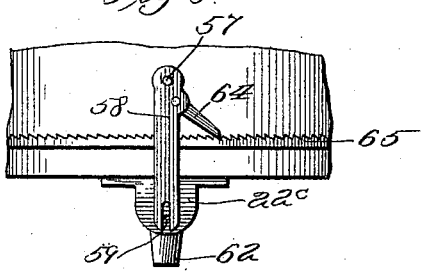

Figure 1 is a vertical axial section of one embodiment of my present invention, and Fig. 1$^a$ is a detail vertical section on the line $a\ a$, Fig. 1. Figs. 2 and 3 are respectively a vertical axial section and an end elevation of another embodiment of my said invention. Fig. 4 is a vertical axial section of another form embodying the invention, this figure illustrating the application of the invention to an ordinary cyclone dust-catcher, and Fig. 4$^a$ is a modified form of the agitator which may be employed in Fig. 4 when the dust-arresting material is of a fibrous nature. Figs. 5 and 6 are respectively a top plan of the form of machine shown in Fig. 4 and a horizontal section through such a machine, the plane of section being indicated by the line $b\ b$, Fig. 4. Figs. 7 and 8 are a vertical diametric section and a detail view of another form.

Referring to Figs. 1 and 1$^a$, 1 represents a settling-drum into which air may be introduced through a tangential opening 2 to produce a centrifugal separation of the heavier particles from the dust-laden air. 3 is a shaft mounted centrally within the drum 1 and carrying the fan-motor 4 in position to receive the impact of the current of air and imparting a rotary movement to the shaft 3. 5 is a sweep carried by the shaft 3 and adapted to collect the heavier particles of material which escape from the air by vertical action and to discharge said particles through a spout 6. The chamber 1 has an end opening 7. In so much of the machine there is nothing particularly novel.

Mounted over the cylinder 1 and in position to receive the air which escapes therefrom is a filtering-chamber 8, formed with double walls 9 and 10, the space between which is filled with a filtering material 11. The walls 9 and 10 are perforated, and the air which rises out of the cylinder 1 escapes through such perforations and finding its way through the small pockets or interstices between the component parts of the filtering material passes to the outside. Any dust, however fine, which is suspended by the current of air lodges in the pockets between the component parts of the material and is there arrested.

12 is a sweep carried by the upper portion of the shaft 3, which extends through the chamber 8 and serves to sweep from the inner surface of the wall 9 those particles which adhere to said wall, and at the same time prevents clogging of the perforations in said wall.

13 is an agitator mounted upon a shaft 14, whose upper end turns in a bracket 15, while its lower end carries a friction-roller 16, which fits in the space between the walls 9 and 10. A bevel-gear 17 on shaft 14 meshes with a bevel-gear 18 on a drive-shaft 19 and thereby transmits rotary movement from the said shaft 19 to the shaft 14. The shaft 19 is mounted in brackets 20 and has a driving-pulley 21.

22 represents a shield which corresponds in position to the agitator 13 and covers the portion of the wall 11 which is opposite said agitator, so that the air which escapes at this point is directed down and out at a spout 23.

The agitator 13 is such that it stirs up or agitates the component parts of the filtering material and breaks up the pockets in which the dust has lodged, so that the air passing through the filtering-wall along the line of the agitator carries with it the dust which has from time to time lodged among the particles of filtering material, and escaping into the shield 22 may be collected at the spout 23. The construction of the agitator 13 is also such that by its rotation the material adjacent to it is gradually fed along, so that if a relative movement is produced between the agitator and the whole body of the filtering material all of such material will gradually come to be treated by the agitator and thus relieved of all of the dust accumulated in it and passed on to repeat the operation of arresting the dust. It will be seen that the agitator only disturbs the material in its immediate vicinity, and that as this is only a very small section of the material the main body of the filtering-wall is at all times ready for the passage of the dust-laden air and in condition to arrest the dust.

In order to produce the relative movement necessary to bring all parts of the filtering-wall successively under the cleansing influence of the agitator, the form of machine shown in Fig. 1 has means for continually advancing the body of material while the agitator remains stationary. To accomplish this purpose, the chamber 8 is supported by balls 24 upon the cylinder 1, whereby it may readily turn thereon, and the shaft 19 carries an eccentric 25, which operates a pawl 26, resting upon the ratchet edge 27 of the outer wall 10, so that for each revolution of the shaft 19 the chamber 8, with its contents, will be advanced slightly, so as to bring a new portion of the filtering material constantly within the reach of the agitator.

In Figs. 2 and 3 is shown a form of machine made on the basis of the horizontal cylinder 8$^a$, having double perforated walls 9$^a$ 10$^a$, containing the filtering material 11 and receiving the dust-laden air through a tangential inlet 2$^a$, while the heavier particles, which settle by centrifugal force, escape through the spout 6$^a$. 13 13 are two agitators similar to that described in Fig. 1 and meshing by gears 17$^a$ 17$^a$ on their shafts and the gears 18$^a$ 18$^a$ on a shaft 19$^a$, so as to receive motion from a pulley 21$^a$. 4$^a$ represents a fan-motor upon the hollow shaft 30, so as to assist in imparting rotary movement to said shaft, and 12$^a$ are sweeps carried by said shaft for keeping the inner faces of the cylinder-head clear. 22$^a$ 22$^a$ are shields, which are carried by hollow shaft 30, so as to be held in position over the agitators 13 and to receive the dust dislodged by said agitators and deliver the same into the hollow shaft 30, from whence it escapes through a spout 31. By reason of the nature of the gearing 17$^a$ 18$^a$ and of the action of the air upon the fan-motor 4$^a$ a slow rotary motion is imparted to said shaft 30, together with all the parts carried by it, said motion being governed by the feeding action of the agitator 13, as hereinbefore explained. The result is that while the walls 9$^a$ and 10$^a$, together with the inclosed material 11, remain stationary the agitators 13 will gradually pass around through said material and treat all parts of it successively and a little at a time, while leaving the remainder in condition to arrest the dust from the air which is passing through the walls. 32 32 are stand-pipes, through which material is introduced, and which may be kept filled to replace shrinkage by wear and keep the material under proper pressure and in packed condition in the machine.

In Figs. 4, 5, and 6 is shown a form of machine adapted to be mounted over an ordinary cyclone dust-catcher. The dust-catcher is represented by 33 and its axial opening at 34. 35 represents a conical chamber formed of double perforated walls 9$^b$ 10$^b$, having the space between them filled with the filtering material 11. 36 represents a shaft which carries a fan-motor 4$^b$ in the settling-chamber 33 and an angularly-arranged sweep 37 in the chamber 35. On its upper end the shaft carries a gear-wheel 38 and a drive-pulley 39. 40 is a casting, which fits in a socket 41, so as to be adapted to turn in the upper end of the chamber 35, and this casting carries the agitator 13, located between the walls of the chamber and the shield 22$^b$, which hangs down over the outer wall of the chamber in position corresponding to the agitator 13. By the nature of the connection between the agitator 13 and the shaft 36 and the feeding action of said agitator the casting 40, together with the parts carried by it, slowly travel around the cone-shaped chamber 35. 42 represents a trip-valve, which normally closes the lower end of the shield 22$^b$, so as to prevent the escape of the dust, but which is engaged and opened by a projection 43 each time the shield 22$^b$ comes opposite a fixed spout 44. 45 is a spout leading from the floor of the conical chamber and serving to deliver into the spout 44 the material which settles in chamber 35.

In Figs. 7 and 8 is shown an upper centrifugal sifting-chamber 50, having a tangential inlet 51 for dust-laden air and a spouted outlet 52 for escape of heavier particles which are separated by centrifugal force, and beneath the eye of the settling-chamber is chamber 53, having a rotatable drum 54 with a single perforate bottom 55, upon which rests a body of filtering material 11. The air escaping from chamber 50 passes downward through filtering material 11 and all remaining dust is arrested. 56 is an agitator, comprising a rake pivoted by its back at 57 and receiving a rocking motion from an arm 58, engaged by crank 59 of shaft 60, which is rotated by pulley 61. The rocking movement thus imparted to the rake agitates the filtering material sufficiently to permit the escape of arrested dust from the restricted area of agitation, while the major part of the material remains in condition to arrest the dust from the escaping air, and the arrested dust which is dislodged by agitator 56 is collected in shield 22$^c$ and discharged through spout 62 by the conveyer 63 on shaft 60. A pawl 64 on the agitator 56 engages a peripheral ratchet 65 on the drum 54, and each time the agitator vibrates advances the drum by the space of one tooth. By this means the entire body of filtering material is brought under the cleansing action of the agitator from time to time, while the operation of arresting the dust goes on uninterrupted. 66 is the turning-post of the drum, stepped in the bearing 67 and carrying at its upper end a swivel-bearing 68 for the agitator. 69 is a packing closing the crack between drum 54 and the wall of chamber 53.

A filtering material which is well adapted for the purposes of my invention is grain of various kinds or other material of similar form. Another material which will serve the purpose well is fiber of various kinds. If it is desired to use fiber as a filtering material, the agitator 13$^a$, as shown in Fig. 4$^a$, should be used. This consists, as shown, of a shaft having short teats or projections, which will pick over the fiber so as to release the material therefrom and permit its escape in the manner hereinbefore explained.

Having thus described my invention, the following is what I claim as new therein and desire to secure by Letters Patent:

1. A dust-catcher comprising a stationary wall of air-filtering material through which the dust-laden air is passed and an agitating device located within the said wall in a restricted portion thereof for separating the dust taken up by the wall from the latter; substantially as described.

2. A dust-catcher comprising a filtering-body through which the dust-laden air is forced and by which the dust in said air is arrested, an agitator, located within the said filtering-body in a restricted portion thereof for agitating the component parts of the filtering-body surrounding it, to permit the escape of the dust arrested thereby, and means for producing a relative movement between the agitator and the body of filtering material, whereby all parts of the latter are successively relieved of their dust, as explained.

3. A dust-catcher comprising a wall of air-filtering material, an agitator located within and operating upon a restricted portion of the filtering material to produce relative movement between the component parts and release the arrested material therefrom and permit its discharge by the current of air, a conducting-passage corresponding in position to the agitator and receiving and conducting away the dust released by the latter, and means for effecting a relative movement between the body of material and the agitator and conducting-passage whereby all parts of said material are successively treated, as explained.

4. A dust-catcher comprising a settling-chamber, means for delivering a current of dust-laden air into said settling-chamber in a manner to produce a vortical movement and cause the settling of the larger particles suspended in the air, a filtering-wall through which the air bearing the finer particles is subsequently forced and by which said finer particles are removed from the air as explained, and an agitator located within the wall in a restricted portion thereof.

5. In a dust-catcher, the combination of a circular chamber having double perforated walls, a body of filtering material located between said walls, an agitator comprising a shaft having projections which tend to feed the material relatively to the shaft when the latter is rotated and means substantially as described for rotating said shaft as explained.

6. In a dust-catcher, the combination of a circular chamber formed of double perforate walls and having a space between them filled with a filtering medium made up of small component parts, a shaft mounted concentrically in said chamber and a shaft projecting radially from said concentric shaft, projecting into the body of filtering material, having projections which agitate said material, and adapted to be moved progressively through said material, by the concentric shaft, as explained.

7. In a dust-collector the combination of a chamber formed of double walls perforated for the escape of air from the chamber and having a space between them filled with a filtering medium made up of small parts, a shaft mounted to rotate concentrically in the chamber, an agitator geared to the concentric shaft and projecting radially from the same, into the body of filtering material between the walls, and provided with projections which cause a progressive movement of the shaft through the material when rotated, as explained.

8. In a dust-collector the combination of a chamber formed with double walls perforated for the passage of air through them and having a space between them filled with a filtering medium of small component parts, a central shaft in the chamber, an agitating-shaft receiving movement from the central shaft and projecting from the latter into the body of filtering material and a brush moving over the face of the inner wall of the chamber to clear the same and receiving motion from said central shaft, as explained.

9. In a dust-collector the combination of a hood formed with double perforated walls, and supplied between said walls with a layer of material and an agitator located within the material in a restricted portion thereof, said hood being adapted to be placed over the air-outlet of an ordinary centrifugal dust-collector, whereby the fine particles of dust are arrested, as explained.

JOHN M. CASE.

Witnesses:
H. S. KNIGHT,
F. R. PROCTOR.